United States Patent [19]

Havens et al.

[11] Patent Number: 5,042,252
[45] Date of Patent: Aug. 27, 1991

[54] NEUTRAL SHIFTING MECHANISM FOR HYDROSTATIC TRANSMISSION

[75] Inventors: Dale I. Havens, Addison; Norman E. Jolliff, Onsted, both of Mich.; George D. Arnold, Jersey, Channel Islands

[73] Assignee: Unipat AG, Glarus, Switzerland

[21] Appl. No.: 482,972

[22] Filed: Feb. 22, 1990

[51] Int. Cl.⁵ .............................................. F16D 39/00
[52] U.S. Cl. ........................................ 60/487; 60/489; 60/490; 91/497; 91/498; 417/221
[58] Field of Search .................... 60/487, 489, 490; 91/497, 498; 417/221

[56] References Cited

U.S. PATENT DOCUMENTS

| | | |
|---|---|---|
| 2,583,704 | 1/1952 | Nicholls et al. |
| 3,165,069 | 1/1965 | Adamek |
| 3,680,652 | 8/1972 | Greene |
| 3,724,583 | 4/1973 | Caldwell |
| 4,627,237 | 12/1986 | Hutson ............................. 60/490 X |
| 4,635,535 | 1/1987 | Thoma et al. ........................ 91/498 |
| 4,639,203 | 1/1987 | Zumbusch |
| 4,691,512 | 9/1987 | Thoma et al. ..................... 60/487 X |
| 4,781,022 | 11/1988 | Hayashi et al. ................... 60/490 X |
| 4,827,721 | 5/1989 | Hayashi et al. ....................... 60/489 |
| 4,845,951 | 7/1989 | Hayashi et al. .................. 60/489 X |
| 4,854,125 | 8/1989 | Inoue .................................... 60/489 |
| 4,875,390 | 10/1989 | Hayashi et al. ................... 60/487 X |
| 4,914,914 | 4/1990 | Inoue .................................... 60/489 |
| 4,938,024 | 7/1990 | Matsuto et al. .................. 60/489 X |
| 4,951,469 | 8/1990 | Hayashi et al. ..................... 60/489 |

FOREIGN PATENT DOCUMENTS

| | | | |
|---|---|---|---|
| 1186753 | 2/1965 | Fed. Rep. of Germany | 60/341 |
| 2343173 | 9/1977 | France | 60/490 |
| 232373 | 4/1925 | United Kingdom | 91/497 |

Primary Examiner—Edward K. Look
Assistant Examiner—Todd Mattingly
Attorney, Agent, or Firm—Young & Thompson

[57] ABSTRACT

The present invention is a neutral shifting mechanism for a hydrostatic transmission. A motor track ring has a groove and cam slot for receiving a control rod of the transmission, with the control rod having a cam portion for engaging the cam slot to lock the track ring in a position concentric with the pintle of the hydraulic motor, i.e. a neutral position. In the normal position, the cam portion positions the track ring eccentrically, allowing a speed control shaft to shift the hydrostatic transmission by pivoting the pump track ring about the control rod.

15 Claims, 3 Drawing Sheets

FIG_1

FIG_2

NEUTRAL SHIFTING MECHANISM FOR HYDROSTATIC TRANSMISSION

BACKGROUND OF THE INVENTION

The field of the invention relates to hydrostatic transmissions. More specifically, the field is that of neutral shifting mechanisms for hydrostatic transmissions.

A hydrostatic transmission transmits energy from mechanical rotary motion to fluid (typically oil) movement, then back to mechanical rotary motion. Within a transmission, a cylinder unit rotates on a pintle, with pistons positioned within the cylinders and attached to slippers mounted in an expander band, so that as the cylinder unit rotates the pistons are driven by the slippers which engage the surrounding eccentric annular track ring. The pistons of the driving cylinder unit create a pressurized fluid flow that drives a receiving set of pistons which rotate an output shaft. The transmission ratio is directly proportional to the eccentricity of the track ring relative to the pintle. U.S. Pat. No. 4,635,535 and 4,691,512, which are incorporated by reference herein, describe hydraulic units which may be used within a hydrostatic transmission.

One common application of a hydrostatic transmission is with a riding lawn mower. Although riding lawn mowers are usually self-propelled, in many situations the use of a riding lawn mower involves manually pushing the mower. For example, to guide the mower over obstacles such as ditches or foliage an operator may not feel comfortable riding the mower. Alternately, vehicles are often rearranged in a garage or storage area when their engines are not running. Also, an operator may be required to manually push the mower because of an engine failure.

Hydraulic transmissions present a special problem when the vehicle is to be moved manually. In gear transmissions, the gears coupling the input and output shafts can be disengaged, so that moving the vehicle manually is possible with little resistance from the transmission system. However, with hydraulic transmissions, the hydraulic motor remains engaged and presents substantial resistance to the movement of the vehicle.

Conventional hydrostatic transmissions achieve a neutral state by releasing the pressure within the fluid flow so the pistons have no driving force. Opening check valves within the pintle of the hydrostatic transmission short circuit the oil passages which connect the hydraulic pump and motor. The short circuit in the oil passages prevents the rotation of either the input or output shafts from effecting the movement of the other. However, using check valves presents difficulties involving unseating the valve which requires complicated and unwieldy control mechanisms within the limited area inside the casing of the transmission, adding to the expense while decreasing the efficiency and reliability of the hydrostatic transmission.

What is needed int he art is an improved neutral shift mechanism which conveniently operates within a hydrostatic transmission. Further, an improved shifting mechanism which provides a locked neutral position in the shift control for a hydrostatic transmission is needed.

SUMMARY OF THE INVENTION

The present invention is a neutral shifting mechanism for a hydrostatic transmission which locks the hydraulic motor in a concentric position to minimize its resistance to the movement of the input or output shafts. The transmission does not need a check valve or other mechanism to maintain the neutral state, because the lack of eccentricity ensures that the pistons do not create a fluid pressure or flow.

In hydrostatic transmissions, the eccentricity of the pintle and the track ring determines the torque delivered by the transmission. In positioning the pintle and track ring relatively concentric, the pistons do not substantially move within their cylinders and so the transmission system offers little resistance to movement of the output shaft. The present invention, in one form thereof, comprises a laterally movable shaft for shifting the position of the track ring of the hydraulic pump, which pivots the pump track ring about a fixed, rotatable rod. The rod has a cam which is used to engage the track ring of the hydraulic motor in a concentric position relative to the pintle by pivoting about the shaft which is fixed in position relative to the motor track ring. Once the track ring of the motor is locked into place by the cam, moving the vehicle manually is facilitated because the wheels do not backdrive the pump.

The present invention, in one form, is a hydrostatic transmission comprising a hydraulic pump, a hydraulic motor, and a conduit or pintle connecting the pump and motor. The hydraulic pump is driven by an input shaft and connected to the fluid conduit. The hydraulic motor is coupled to an output shaft. The hydraulic motor includes a plurality of radial cylinders in fluid communication with the conduit, and a plurality of pistons disposed within the cylinders. A track ring is disposed around the hydraulic motor and engages slippers which are coupled to the pistons, with the relative eccentricity of the track ring with respect to the center of the hydraulic motor determining the amount of driving force delivered by the transmission. A control device is coupled to the track ring for moving the track ring and changing the relative position of the center of the track ring with respect to the axis of the hydraulic motor between a concentric position and an eccentric position.

One advantage of the present invention is the provision of a neutral shift mechanism which concentrically positions the pintle and track ring of the motor in a hydrostatic transmission.

Another advantage of the present invention involves using a shaft to pivot the pump track ring about a rod, and using a cam portion of the rod to pivot the motor track ring about the shaft.

BRIEF DESCRIPTION OF THE DRAWINGS

The above mentioned and other features and advantages of this invention, and the manner of attaining them, will become more apparent and the invention itself will be better understood by reference to the following description of an embodiment of the invention taken in conjunction with the accompanying drawings, wherein.

Figure 1:
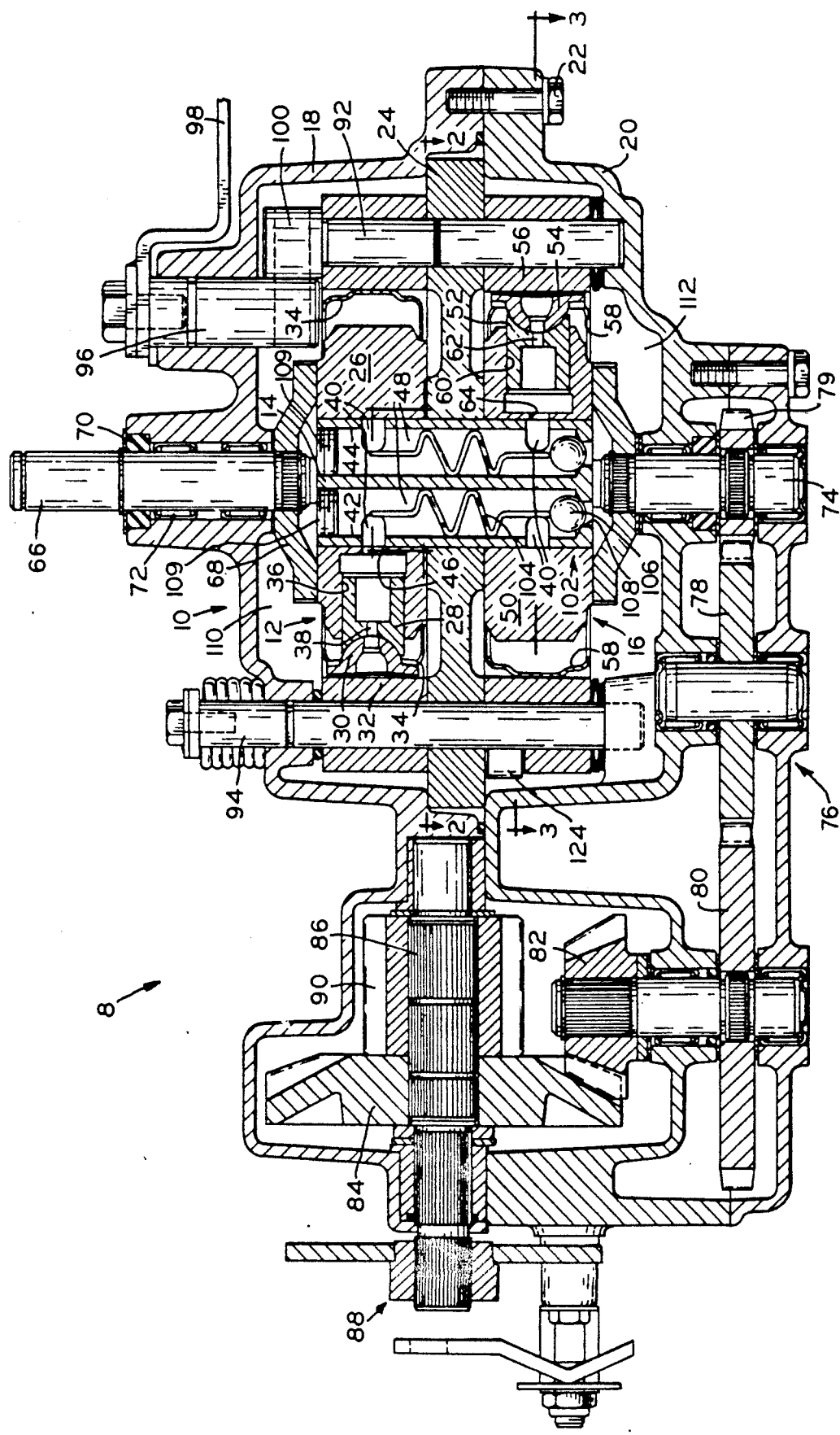
FIG. 1 is a sectional view of a hydrostatic transmission embodying one form of the present invention.

Corresponding reference characters indicate corresponding parts throughout the several views. The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

The present invention relates to a hydrostatic transaxle 8 having a hydrostatic unit 10 as shown in FIG. 1. Hydrostatic unit 10 comprises a pump 12, a pintle 14, and a motor 16. Upper and lower housings 18 and 20 enclose hydrostatic unit 10 and contain the hydraulic fluid of hydrostatic unit 10, with housings 18 and 20 attached together by a plurality of bolts 22. A central sandwich plate 24 separates pump 12 from motor 16, while allowing pintle 14 to extend therethrough.

Pump 12 comprises a cylinder unit 26, pistons 28, slippers 30, track ring 32, and expander band 34. Pistons 28 are positioned within cylinders 36 of cylinder unit 26, and have connecting pins 38 which attach to corresponding slippers 30. Positioned eccentrically around pintle 14, expander band 34 receives slippers 30 and rotates within annular track ring 32 so that slippers 30 cause pistons 28 to reciprocate radially within cylinders 36. Expander band 34 is preferably a rolled metallic split strip which resiliently holds slippers 30 against track ring 32.

Pintle 14 provides an axis for the rotation of cylinder unit 26, and has pintle ports 40 and tubes 42 and 44 for fluid communication. Cylinders 46 are formed in the axially interior region of cylinder unit 26 so they can be matched with pintle ports 40 during the rotation of cylinder unit 26. Oil passages 48 within tubes 42 and 44 allow fluid communication between pump 12 and motor 16.

Motor 16 comprises a cylinder unit 50, pistons 52, slippers 54, track ring 56, and expander band 58. Pistons 52 are positioned within cylinders 60 of cylinder unit 50, and have connecting pins 62 which attach to corresponding slippers 54. Ports 64 are formed in the axially interior region of cylinder unit 50 so they can be matched with pintle ports 40 during the rotation of cylinder unit 50. Positioned eccentrically around pintle 14, expander band 58 receives slippers 54 and rotates within annular track ring 56 so that slippers 54 cause pistons 52 to reciprocate radially within cylinders 60. Expander band 58 is preferably a rolled metallic split strip which resiliently holds slippers 54 against track ring 56.

To enable the rotation of pump 12 and motor 16, pintle 14 is generally circular in shape and preferably has two cylindrical tubes 42 and 44 located within its outer walls. In pump 12, cylinder unit 26 is rotatably disposed about pintle 14 which provides an axis for rotation. Cylinder unit 26 comprises a plurality of cylinders 36 which are a fixed axial distance relative to pintle 14 and receive the pistons 24. Pistons 28 are attached to slippers 30 which are disposed on expander band 34, rotating according to cylinder unit 26 within circular track ring 32. Motor 16 is similarly arranged on the opposite side of central sandwich plate 24.

Rotational movement is imparted to pump 12 by input shaft 66 which extends through upper housing 18 to provide the driving force for pump 12 via member 68. Oil seal 70 on upper housing 18 seals input shaft 66, and to rotationally support shaft 66, needle bearings 72 are located within upper housing 18. By this structure rotation is imparted to pump 12, which turns motor 16 to drive output shaft 74 and its associated gear train 76. Hydraulic fluid (e.g. oil) is circulated within hydraulic unit 10 to transmit motion from input shaft by converting the motion to fluid pressure by pump 12, and then by converting the fluid pressure to motion by motor 16 for driving output shaft 74.

Hydrostatic transaxle 8 comprises hydrostatic unit 10 and output gear train 76. Output gear train 76 comprises a series of gears including an intermediate gear 78 driven by gear 79 of output shaft 74, a gear 80 driven by intermediate gear 78, a bevel gear 82 on the same shaft as intermediate gear 78, and a bevel gear 84 of axle driving shaft 86 which is driven by bevel gear 82. A brake mechanism 88 operates on shaft 86 in a known manner. A pinion gear 90 of shaft 86 is coupled to a transaxle differential assembly (not shown) which turns the vehicle axle (not shown).

In order to pump pressurized fluid to translate the rotation of input shaft 66 to output shaft 74, the circles defined by pintle 14 and track ring 32 must be eccentric. Control shaft 92 determines the transmission ratio by pivoting track ring 32 about control rod 94, thus varying the eccentricity of pintle 14 and track ring 32. Control rod 94 extends through track ring 32 and is fixed in position relative to pintle 14, while track ring 32 has a limited ability to rotate. To move control shaft 92, shaft 96 is mounted in upper housing 18 and is rotated by adjusting lever 98. Coupling arm 100 translates the rotary movement of lever 98 and shaft 96 to lateral swinging movement of control shaft 92.

As configured in the preferred embodiment, control shaft 92 moves within a range bounded by two positions. The first position defines a minimum angle between the line defined by the center of pintle 14 and control rod 94 and the line defined by control rod 94 and control shaft 92. The angle increases as control shaft 92 moves to its second position which defines a maximum angle between the line defined by the center of pintle 14 and control rod 94 and the line defined by control rod 94 and control shaft 92. The angle, and hence the degree of eccentricity, increases as control shaft 92 travels from its first to its second position. The degree of eccentricity can be limited to positive values to provide only forward motion, or the degree of eccentricity can range from negative to positive values providing both forward and reverse motion.

The displacement of pistons 28 in cylinders 36 is determined by the eccentricity of track ring 32 with respect to pintle 14. The greater the degree of eccentricity (whether positive or negative), pistons 28 have correspondingly greater displacements. As cylinder unit 26 is rotated, pistons 28 within cylinders 36 are rotated causing their corresponding slippers 30 to orbit pintle 14 elliptically; when a slipper 30 and pintle 14 are closest, the corresponding piston 28 is at its closest position relative to pintle 14. On the other side of the orbit, when they are farthest apart, the corresponding piston 28 is at its farthest position relative to pintle 14. As the slippers 30 are moved, expander band 34 rotates, guided by track ring 32. Slippers 30 are resiliently held against track ring 32 so that their radial positions are generally defined by cylinders 36 of cylinder unit 26. As a practical matter, slippers 30 tend to move slightly within expander band 34 during each rotation. However, pistons 28 move from the closest relative position to the farthest relative position every rotation of cylinder unit 26. By so moving, pistons 28 create a pressurized fluid flow within oil passages 48.

To provide access to oil passages 48, check valves 102 are located near the bottom of tubes 42 and 44 of pintle 14. Check valves 102 are provided so that oil can be discharged from hydrostatic unit 10 to relieve excessive pressure, to change the oil, or to supply additional oil. Check valves 102 comprise a pintle spring 104 which normally holds a steel ball 106 over pintle discharge opening 108. Plugs 109 are screwed into threads of pintle 14 to seal the tops of tubes 42 and 44. Hydrostatic unit 10 includes an oil reservoir (not shown). In addition, housings 18 and 20 define oil cavities 110 and 112, respectively, which are normally maintained full of oil. Central sandwich plate 24 separates cylinder units 26 and 50 so that they rotate independently around pintle 14, and prevent oil from flowing between the cylinder units except through oil passages 48. Also, central sandwich plate 24 allows oil to flow between oil cavities 110 and 112 so oil can circulate within hydrostatic unit 10.

Figure 2:
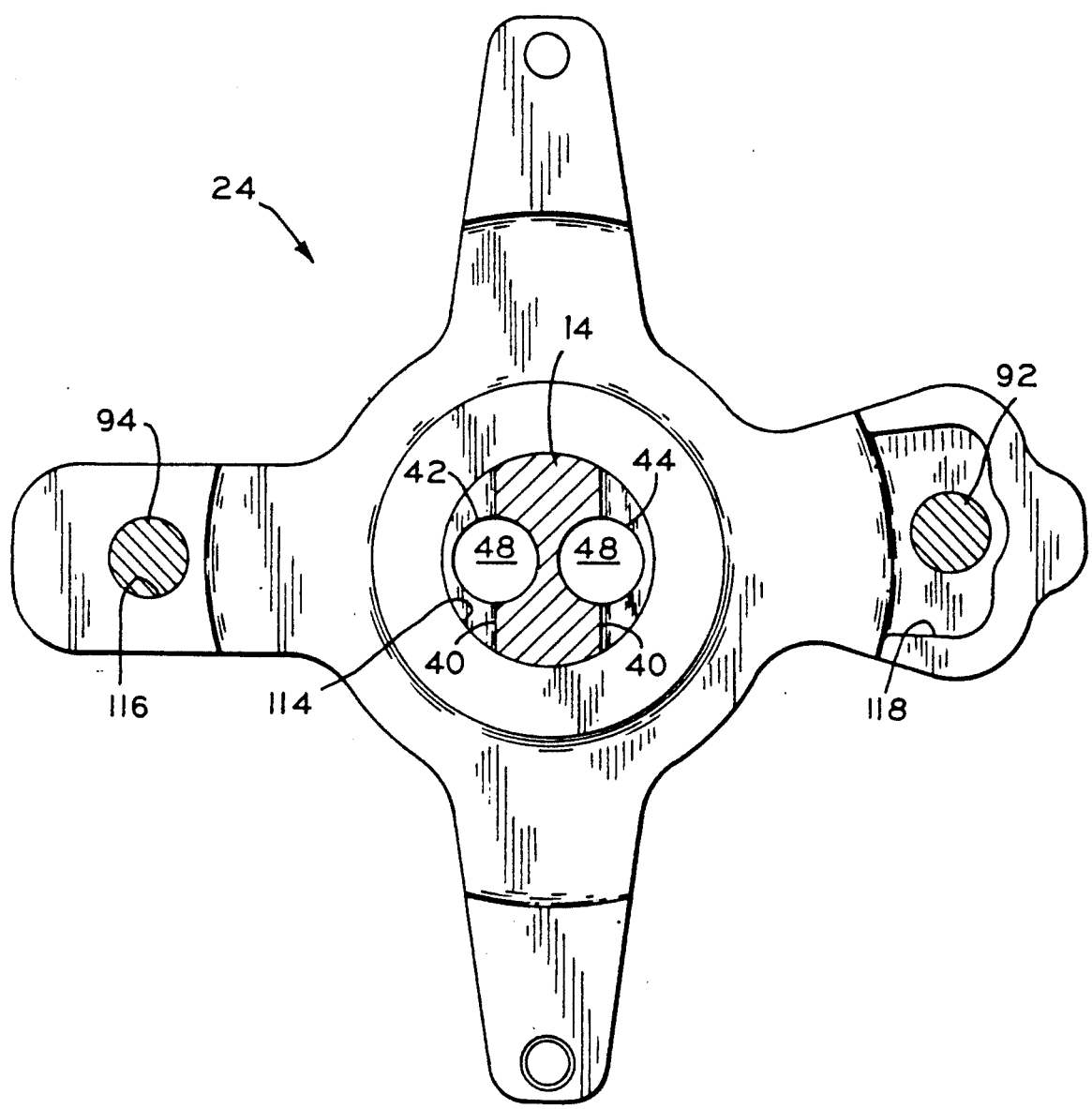
FIG. 2 is a sectional view taken along line 2—2 of FIG. 1 in the direction of the arrows.

Referring to FIG. 2, central sandwich plate 24 receives pintle 14 in pintle opening 114, which is shaped to support tubes 42 and 44. Also, opening 116 is provided to allow control rod 94 to extend through plate 24, with control rod 94 rotatably disposed within opening 116. Additionally, control shaft 92 is laterally movable in control shaft recess 118, thus allowing the lateral swinging movement of track ring 32.

Figure 3:
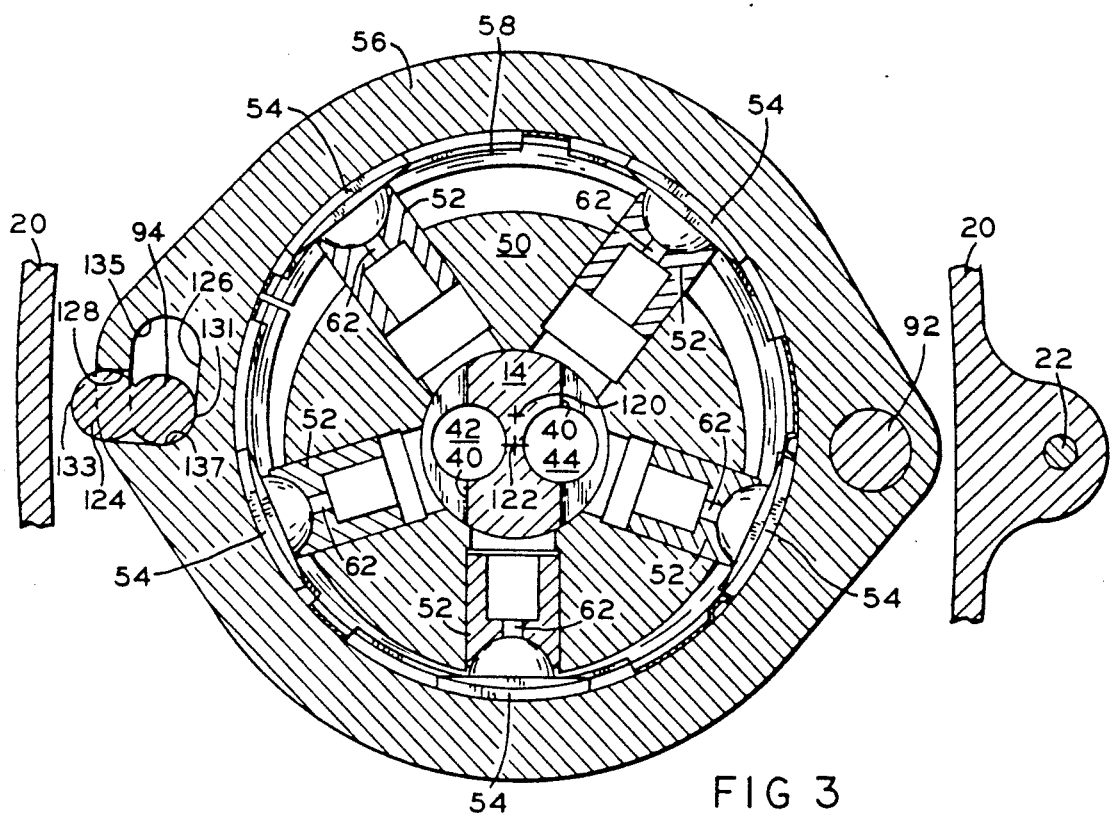
FIG. 3 is a sectional view taken along line 3—3 of FIG. 1 in the direction of the arrows wherein the motor track ring is in an eccentric position.
Figure 4:
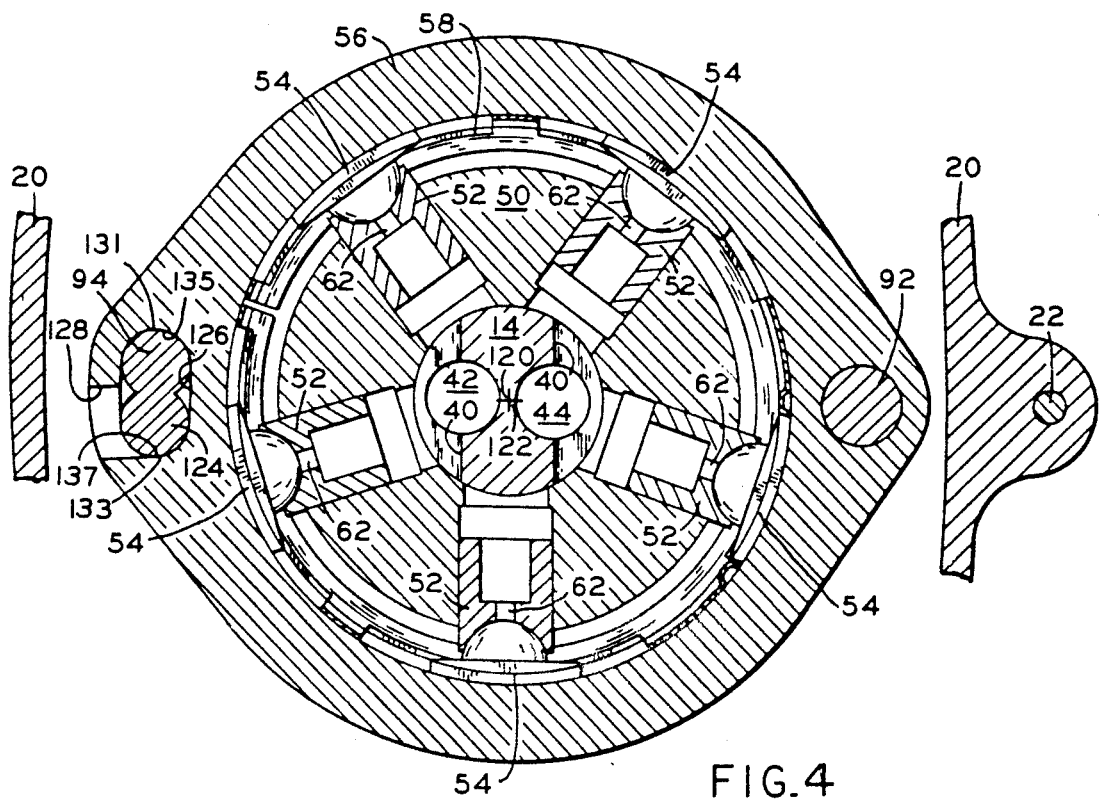
FIG. 4 is a sectional view similar to FIG. 3 wherein the motor track ring is in a concentric position.

In accordance with the present invention, motor track ring 56 is movable between a neutral and an active position. The positioning of track ring 56 by control rod 94 is shown in FIGS. 3 and 4. Control rod 94 has a cam portion 124 which determines the eccentricity of motor 16 by its position in either cam slot 126 or groove 128, while control shaft 92 is fixed in position relative to track ring 56. Preferably, control shaft 92 comprises two distinct sections, a laterally movable section disposed in track ring 32 and a laterally stationary section disposed in track ring 56. In FIG. 3, cam portion 124 extends into groove 128 so that track ring 56 and pintle 14 are eccentric, i.e. centers 120 and 122 are not located at the same point. In FIG. 4, both control rod 94 and cam portion 124 are positioned within cam slot 126 so that track ring 56 and pintle 14 are concentric, i.e. centers 120 and 122 are located at the same point.

As provided in the present invention, motor 16 is disengaged from output shaft 74 by concentrically positioning track ring 56 and pintle 14. For example, to push a riding lawn mower the operator shifts hydrostatic transaxle to neutral. To enter a neutral state, a 90° turn of control rod 94 pivots track ring 56 about control shaft 92, aligning and locking track ring 56 concentrically with respect to pintle 14 by engaging cam portion 124 within cam slot 126. When concentric, neither movement of output shaft 74 nor fluid pressure from pump 12 rotates motor 16. The turning of control rod 94 is achieved by movement of a shifting arm (not shown). Motor 16 can be locked in a neutral state by the rotation of control rod 94, pivoting track ring 56 about control shaft 92. This locking action is caused by a friction interference fit of surfaces 131 and 133 against surfaces 135 and 137, respectively, of slot 126 (FIG. 4)

To determine the fluid pressure of pump 12 and therefore the speed of motor 16, control shaft 92 moves laterally to alter the eccentricity of track ring 32 in relation to pintle 14. Control shaft 92 moves from a minimum angle position to a maximum angle position, the angle being determined by a line defined by pintle center 122 and control rod 94 and a line defined by control shaft 92 and control rod 94. The minimum angle position determines a minimum eccentricity of pump 12, while the maximum angle position determines a maximum eccentricity of pump 12. Thus, hydraulic unit 10 can operate in a variety of forward and reverse transmission ratios by pivoting track ring 32 about control rod 94. The pivot of pump 12 also moves track ring 56 of motor 16, and the pivot of motor 16 moves track ring 32 of pump 12.

While this invention has been described as having a preferred design, it can be further modified within the teachings of this disclosure. This application is therefore intended to cover any variations, uses, or adaptations of the invention following its general principles. This application is also intended to cover departures from the present disclosure as come within known or customary practice in the art to which this invention pertains and fall within the limits of the appended claims.

What is claimed is:

1. A hydrostatic transmission, comprising:
   a conduit means for fluid communication;
   a hydraulic pump coupled to an input shaft and in communication with said conduit means, said hydraulic pump including a first rotatable cylinder unit comprising a plurality of radial cylinders disposed about an axis of rotation of said first cylinder unit, and a plurality of first pistons disposed within said cylinders;
   a hydraulic motor coupled to an output shaft and in communication with said conduit means, said hydraulic motor including a second rotatable cylinder unit comprising a plurality of radial cylinders disposed about an axis of rotation of said second cylinder unit, and a plurality of second pistons disposed within said cylinders;
   said hydraulic pump and hydraulic motor positioned coaxially within said hydrostatic transmission;
   an annular track ring disposed around said second cylinder unit and engaged by a plurality of slipper means connected respectively to said second pistons, said track ring determining the relative position of said slipper means with respect to said axis of rotation of said second cylinder unit; and
   a control means coupled to said track ring for engaging and moving said track ring to a concentric position from an eccentric position and locking said track ring in said concentric position, and for moving said track ring from said locked concentric position to said eccentric position, said concentric and eccentric positions determined by the relative position of circles defined by said track ring and the axis of rotation of said second cylinder unit;
   said control means comprising an axially fixed, rotatable rod having a cam capable of engaging a slot of said track ring to lock said hydraulic motor and said track ring in said concentric position, and further comprising a shifting means coupled to said hydraulic pump, said shifting means providing a continuously variable transmission;
   wherein said shifting means pivots said hydraulic pump about said rod, and said rod moves said track ring about said shifting means.

2. The hydrostatic transmission of claim 1 wherein said conduit means comprises a pintle in a fixed position having passages for fluid communication, said pintle providing a common axis of rotation for said hydraulic pump and said hydraulic motor.

3. The hydrostatic transmission of claim 2 further comprising a pintle support means disposed intermediate said hydraulic pump and said hydraulic motor.

4. The hydrostatic transmission of claim 3 further comprising a transmission housing surrounding said hydraulic pump, said pintle support means, and said hydraulic motor, said transmission housing forming first and second cavities for holding fluid within said hydrostatic transmission.

5. In a hydrostatic transmission comprising a radial piston pump and a radial piston motor coaxially positioned about a pintle, a shifting assembly comprising:
   a first annular track ring disposed around said pump;
   a second annular track ring disposed around said motor; and
   control means coupled to said first and second track ring for shifting and locking said hydrostatic transmission, said control means having a first position wherein circles defined by said second track ring and said pintle are concentric, and a second position wherein circles defined by said second track ring and said pintle are eccentric, said control means engaging said second track ring to secure said second track ring in said first position so that said radial piston motor provides a minimal resistance against rotation while in said first position, said control means for moving said first track ring to provide a continuously variable transmission while in said second position;
   wherein said second track ring defines a hole receiving a rod of said control means, said hole being elongated to allow said second track ring to vary its position between said first position and said second position, said second track ring also defining a slot, said rod having a cam structured and arranged to lock said second track ring in said first position and in said second position, said rod capable of rotating and moving said cam into and out of said slot thereby moving said second track ring and changing the location of said rod with respect to said elongated hole.

6. The hydrostatic transmission of claim 5 wherein said control means comprises a fixed, rotatable rod having a cam engaged with a slot of said second track ring to secure said second track ring in said first position.

7. The hydrostatic transmission of claim 5 wherein said first track ring receives a movable portion of a shaft of said first control means and said first track ring pivots about said rod, said movable portion structured and arranged to pivot said first track ring and provide continuously variable transmission.

8. A hydrostatic transmission, comprising:
   a conduit means for fluid communication;
   a hydraulic pump coupled to an input shaft and in fluid communication with said conduit means, said hydraulic pump including a first rotatable cylinder unit comprising a plurality of first radial cylinders disposed about a first axis of rotation, a plurality of first pistons disposed within said first cylinders, each said first piston having an associated first slipper;
   a first track ring disposed around said first cylinder unit and guiding said first slippers, said first track ring determining the relative position of said first slippers with respect to said first axis of rotation;
   a hydraulic motor coupled to an output shaft and in fluid communication with said conduit means, said hydraulic motor including a second rotatable cylinder unit comprising a plurality of second radial cylinders disposed about a second axis of rotation, a plurality of second pistons disposed within said second cylinders, each said second piston having an associated second slipper;
   a second track ring disposed around said second cylinder unit and guiding said second slippers, said second track ring determining the relative position of said second slippers with respect to said second axis of rotation;
   a first control means coupled to said first and second track rings for moving said first track ring and changing the relative eccentricity of circles defined by said first track ring and said first axis of rotation; and
   a second control means coupled to said first and second track rings for shifting said second track ring and changing the relative position of circles defined by said second track ring and the axis of rotation of said second cylinder unit between a concentric position and an eccentric position;
   said first control means pivoting said first track ring about an axis defined by said second control means, said second control means being fixed in position relative to said first axis of rotation, and said second control means pivoting said second track ring about an axis defined by said first control means, a portion of said first control means fixed in position relative to said second axis of rotation.

9. The hydrostatic transmission of claim 8 wherein said conduit means comprises a pintle in a fixed position having passages for fluid communication between said hydraulic pump and said hydraulic motor.

10. The hydrostatic transmission of claim 8 further comprising a pintle support means disposed intermediate said hydraulic pump and said hydraulic motor.

11. The hydrostatic transmission of claim 10 further comprising a transmission housing surrounding said hydraulic pump, said pintle support means, and said hydraulic motor, said transmission housing forming a first and second cavity for holding fluid within said hydrostatic transmission.

12. The hydrostatic transmission of claim 8 wherein said second control means comprises an axially fixed, rotatable rod having a cam for engaging with a slot of said second track ring to secure said hydraulic motor and said second track ring in said concentric position, said second track ring structured and arranged to move between said concentric position and said eccentric position by rotating said rod and thus moving said cam in and out of said slot.

13. The hydrostatic transmission of claim 8 wherein said first control means further includes a shifting means comprising a movable shaft for pivoting said first track ring from a first position having a minimum degree of eccentricity to a second position having a maximum degree of eccentricity.

14. The hydrostatic transmission of claim 8 wherein said second track ring defines a hole receiving a rod of said first control means, said hole being elongated to allow said second track ring to vary position between said concentric position and said eccentric position, said second track ring also defining a slot, said rod having a cam structured and arranged to lock said second track ring in said concentric position and in said eccentric position, said rod capable of rotating and moving said cam into and out of said slot thereby moving said second track ring and changing the location of said rod with respect to said elongated hole.

15. The hydrostatic transmission of claim 14 wherein said first track ring receives a movable portion of a shaft of said first control means and said first track ring pivots about said rod, said movable portion structured and arranged to pivot said first track ring and provide continuously variable transmission.

* * * * *